United States Patent [19]
Dodd et al.

[11] Patent Number: 5,833,614
[45] Date of Patent: Nov. 10, 1998

[54] ULTRASONIC IMAGING METHOD AND APPARATUS FOR GENERATING PULSE WIDTH MODULATED WAVEFORMS WITH REDUCED HARMONIC RESPONSE

[75] Inventors: Stirling S. Dodd, San Jose; Stuart L. Carp; David M. Hedberg, both of Menlo Park; Samual H. Maslak, Woodside; Bhaskar S. Ramamurthy, San Jose; Daniel E. Need, Mountain View, all of Calif.

[73] Assignee: Acuson Corporation, Mountain View, Calif.

[21] Appl. No.: 893,287

[22] Filed: Jul. 15, 1997

[51] Int. Cl.$^6$ ........................................... A61B 8/00
[52] U.S. Cl. ............................................ 600/447
[58] Field of Search .................................... 600/437, 442, 600/443, 447, 448; 73/602, 603, 614; 367/153

[56] References Cited

U.S. PATENT DOCUMENTS

| | | | |
|---|---|---|---|
| 3,991,607 | 11/1976 | Niklas | 73/602 |
| 4,034,332 | 7/1977 | Alais | 367/153 |
| 4,098,130 | 7/1978 | Coffey et al. | 73/614 |
| 4,712,037 | 12/1987 | Verbeek et al. | |
| 5,040,537 | 8/1991 | Katakura | |
| 5,111,823 | 5/1992 | Cohen | |
| 5,115,809 | 5/1992 | Saitoh et al. | |
| 5,190,766 | 3/1993 | Ishihara | |
| 5,195,520 | 3/1993 | Schlief et al. | |
| 5,215,680 | 6/1993 | D'Arrigo | |
| 5,219,401 | 6/1993 | Cathignol et al. | |
| 5,255,683 | 10/1993 | Monaghan | |
| 5,358,466 | 10/1994 | Aida et al. | |
| 5,380,411 | 1/1995 | Schlief | |
| 5,410,205 | 4/1995 | Gururaja | |
| 5,410,516 | 4/1995 | Uhlendorf et al. | |
| 5,417,214 | 5/1995 | Roberts et al. | |
| 5,425,366 | 6/1995 | Reinhardt et al. | |

(List continued on next page.)

FOREIGN PATENT DOCUMENTS 0 357 164 of 0000 European Pat. Off. .
1 770 352 A1 5/1997 European Pat. Off. .

OTHER PUBLICATIONS

Pi Hsien Chang, et al., "Second Harmonic Imaging and Harmonic Doppler Measurements with Albunex." IEEE Transactions on Ultrasonics, Ferroelectrics, and Frequency Control, vol. 42, No. 6, Nov. 1995.

Marc Gensane, "Bubble population measurements with a parametric array." J. Acoustical Society of America, 96 (6), Jun. 1994.

Ken Ishihara, et al., "New Approach to Noninvasive Manometry Based on Pressure Dependent Resonant Shift of Elastic Microcapsules in Ultrasonic Frequency Characteristics." Japanese J. of Applied Physics, vol. 2 (1988).

V.L. Newhouse, et al., "Bubble size measurements using the nonlinear mixing of two frequencies." J. Acoustical Society of America, 75 (5), May 1984.

"Small Spheres Lead to Big Ideas." Research News, Science vol. 267, 20 Jan., 1995.

Abstracts Journal of the American Society of Echocardiography, vol. 8, No. 3 pp. 345–346, 355, 358–364.

(List continued on next page.)

*Primary Examiner*—George Manuel
*Attorney, Agent, or Firm*—Craig A. Summerfield; Brinks Hofer Gilson & Lione

[57] ABSTRACT

An improvement to the method for harmonic imaging including the steps of (a) transmitting ultrasonic energy at a fundamental frequency and (b) receiving reflected ultrasonic energy at a harmonic of the fundamental frequency is provided. The transmitting step includes the step of transmitting a waveform comprising at least a sequence of at least a first and second pulse characterized by first and second pulse durations, respectively, where the second pulse duration is different than the first duration. This arrangement can reduce harmonic energy in the waveform.

30 Claims, 8 Drawing Sheets

U.S. PATENT DOCUMENTS

| | | |
|---|---|---|
| 5,433,207 | 7/1995 | Pretlow, III . |
| 5,438,554 | 8/1995 | Seyed-Bolorforosh et al. . |
| 5,456,255 | 10/1995 | Abe et al. . |
| 5,456,257 | 10/1995 | Johnson et al. . |
| 5,469,849 | 11/1995 | Sasaki et al. . |
| 5,479,926 | 1/1996 | Ustuner et al. . |
| 5,482,046 | 1/1996 | Deitrich . |
| 5,523,058 | 6/1996 | Umemura et al. . |
| 5,526,816 | 6/1996 | Arditi . |
| 5,558,092 | 9/1996 | Unger et al. . |
| 5,560,364 | 10/1996 | Porter . |
| 5,577,505 | 11/1996 | Brock-Fisher et al. . |
| 5,579,768 | 12/1996 | Klesenski . |
| 5,579,770 | 12/1996 | Finger . |
| 5,580,575 | 12/1996 | Unger et al. . |
| 5,601,086 | 2/1997 | Pretlow, III et al. . |
| 5,608,690 | 3/1997 | Hossack et al. . |
| 5,617,862 | 4/1997 | Cole et al. . |
| 5,632,277 | 5/1997 | Chapman et al. . |
| 5,675,554 | 10/1997 | Cole et al. . |
| 5,678,554 | 10/1997 | Hossack et al. . |

OTHER PUBLICATIONS

Deborah J. Rubens, MD, et al., "Sonoelasticity Imaging of Prostate Cancer: In Vitro Results." Radiology, vol. 195, No. 2, 1995.

B. Schrope, et al., "Simulated Capillary Blood Flow Measurement Using a Nonlinear Ultrasonic Contrast Agent." Ultrasonic Imaging 14 (1992).

Fred Lee, Jr., MD, et al., "Sonoelasticity Imaging: Results in in Vitro Tissue Specimens." Radiology, vol. 181, No. 1 (1991).

Kevin J. Parker, PhD., et al., "Sonoelasticity of Organs: Shear Waves Ring a Bell." J. Ultasound Med., 11 (1992).

William Armstrong, M.D., et al., "Position Paper on Contrast Echocardiography." American Society of Echocardiography, draft 1, Jun. 6, 1994.

K.J. Parker, et al., "Tissue Response to Mechanical Vibrations for 'Sonoelasticity Imaging'." Ultrasound in Med. and Biol., vol. 16, No. 3, (1990).

Robert M. Lerner, et al., "'Sonoelasticity' Images Derived from Ultrasound Signals in Mechanically Vibrated Tissues." Ultrasound in Med. and Biol., vol. 16, No. 3 (1990).

Excerpt from Ultrasonics: Fundamentals and Applications (1992), pp. 380–393, 363–365.

J.A. Hossack, et al., "Improving Transducer Performance Using Multiple Active Layers." SPIE vol. 1733 (1992).

Volkmar Uhlendorf, et al., "Nonlinear Acoustical Response of Coated Microbubbles in Diagnostic Ultrasound." IEEE 1994 Ultrasonics Symposium.

John A. Hossack, et al., "Improving the Characteristics of a Transducer Using Multiple Piezoelectric Layers." IEEE Transactions on Ultrasonics, Ferroelectrics, and Frequency Control, vol. 40, No. 2, Mar. 1993.

H. Edward Karrer, et al., "A Phased Array Acoustic Imaging System for Medical Use." IEEE 1980 Ultrasonics Symposium.

"HP Ultrasound Technologies—Viability." About HP Ultrasound Imaging, WWW document 1997.

Ted Christopher, "Finite Amplitude Distortion–Based Inhomogeneous Pulse Echo Ultrasonic Imaging." IEEE Transactions on Ultrasonics, Ferroelectrics, and Frequency Control, vol. 44, No. 1, Jan. 1997.

"Supplement to Journal of the American College of Cardiology." American College of Cardiology, 45th Annual Scientific Session, Mar. 24–27, 1996 pp. 21A, 63A, 239–240A.

Yang–Sub Lee, et al., "Time–Domain Modeling of Pulsed Finite–Amplitude Sound Beams." J. Acoustical Society of America, 97 (2), Feb. 1995.

Michalakis A. Averkiou, et al., "Self–Demodulation of Amplitude and Frequency–Modulated Pulses in a Thermoviscous Fluid." J. Acoustical Society of America, 94 (5), Nov. 1993.

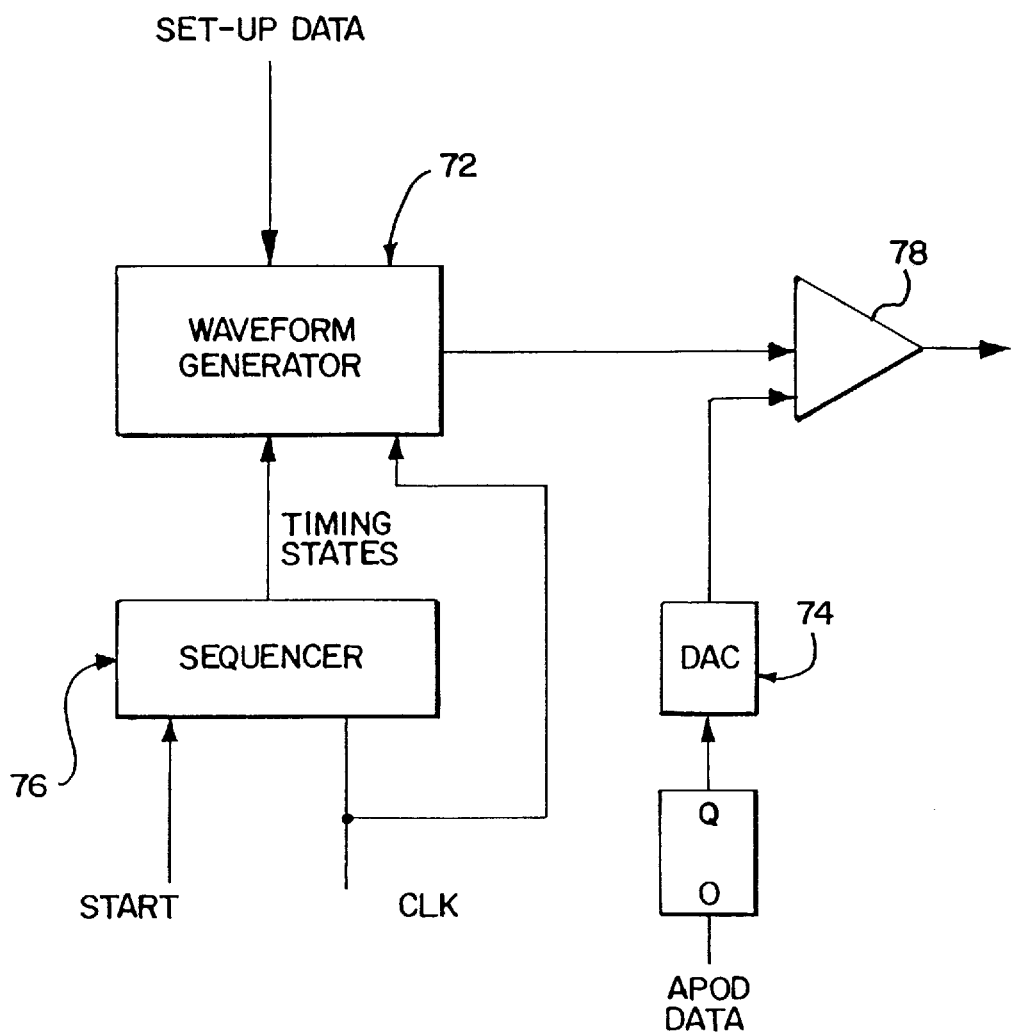

ULTRASONIC IMAGING METHOD AND APPARATUS FOR GENERATING PULSE WIDTH MODULATED WAVEFORMS WITH REDUCED HARMONIC RESPONSE

FIELD OF THE INVENTION

This invention generally relates to ultrasonic imaging systems. In particular, the invention relates to improved systems and methods for imaging using harmonic frequency signals.

BACKGROUND OF THE INVENTION

Ultrasound imaging systems generate and transmit ultrasound signals. The systems typically have several imaging modes, such as B-mode, color flow, and spectral Doppler.

The transmitted ultrasound signals have optimal characteristics set in response to the selected mode. The characteristics include frequency and bandwidth. As an example, B-mode imaging uses transmitted signals with a wide bandwidth and high frequency. As another example, color flow imaging uses transmitted signals with narrow bandwidth and lower frequency as compared to B-mode imaging.

Another type of imaging is harmonic imaging. Harmonic imaging is generally associated with imaging tissue or contrast agents at harmonic frequencies.

Typically, the transmitted ultrasound signal is a burst of sinusoidal waves associated with rectangular or sinusoidal transmit waveforms applied to the transducer. The transmitted signal has a center frequency within the 1 to 15 MHz range. The ultrasound signal propagates through a body. The ultrasound signal reflects off structures within the body, such as tissue boundaries. Some of the reflected signals, or echo signals, propagate back towards the transducer.

As the transmit signal propagates through and scatters within the body, additional frequency components are generated, such as at harmonics of the transmit frequency. These additional frequency components continue to propagate through and reflect off structures in the body. Echo signals having the same frequencies as the transmit signal and echo signals associated with the additional frequency components impinge on the transducer. The additional frequency components are caused by non-linear effects, such as non-linear propagation.

The harmonic signals may also be generated by ultrasound contrast agents. The contrast agents are typically gas or fluid filled micro-spheres which resonate at ultrasound frequencies. The contrast agents are injected in the blood stream and carried to various locations in the body. When insonified, harmonic echo signals are generated due to resonance within the contrast agents.

The echo signals are received, processed and detected by the ultrasound system. For harmonic imaging, energies associated with fundamental or transmit frequencies are removed by receive filtering. Thus, echo signals resulting from non-linear propagation and reflection are detected by the ultrasound system. However, the transmitted burst may include significant energy at the harmonic frequencies. The transmitted energy masks the non-linear response of the body and interferes with the harmonic signals from any contrast agents.

To improve harmonic imaging, it is known to reduce the energy at the harmonic in the transmit burst. The energy at the harmonic is reduced by generating a Gaussian envelope, complex sinusoidal waveform for each channel of a transducer. However, transmit beamformers capable of generating such a complex waveform require expensive components.

The present invention is directed to further improvements that enhance the imaging of the non-linear response of a body.

SUMMARY OF THE INVENTION

The invention relates to improvements to a method for harmonic imaging, which comprises the steps of (a) transmitting ultrasonic energy at a fundamental frequency and (b) receiving reflected ultrasonic energy at a harmonic of the fundamental frequency.

According to a first aspect of this invention, the transmitting step includes the step of transmitting a waveform comprising at least a sequence of at least a first and second pulse characterized by first and second pulse durations, respectively, where the second pulse duration is different than said first duration. This arrangement can reduce harmonic energy in the waveform.

According to a second aspect of this invention, the transmitting step includes the step of transmitting a waveform comprising a plurality of pulses in an ordered sequence, wherein a first duration between first and second pulses is different than a second duration between said second pulse and a third pulse.

According to a third aspect of this invention, the transmitting step includes the step of transmitting a waveform comprising a plurality of pulses, at least a first and second pulse having a first and second pulse duration, said first pulse duration different than said second pulse duration and determined as a function of an approximation of an envelope shape rising gradually to a respective maximum value and falling gradually from the respective maximum value.

According to a fourth aspect of this invention, a method of generating a waveform comprising a sequence of pulses transmitted from at least one of a plurality of transducer elements for harmonic imaging is provided. The method includes the steps of: generating at least a first pulse comprising a first pulse width; generating at least a second pulse comprising a second pulse width, wherein the second pulse width is different than the first pulse width; and transmitting the waveform comprising at least the first and second pulses in sequential order.

BRIEF DESCRIPTION OF THE DRAWINGS

FIG. 2B is a block diagram of a signal generator.

DETAILED DESCRIPTION OF PREFERRED EMBODIMENTS

Figure 1:
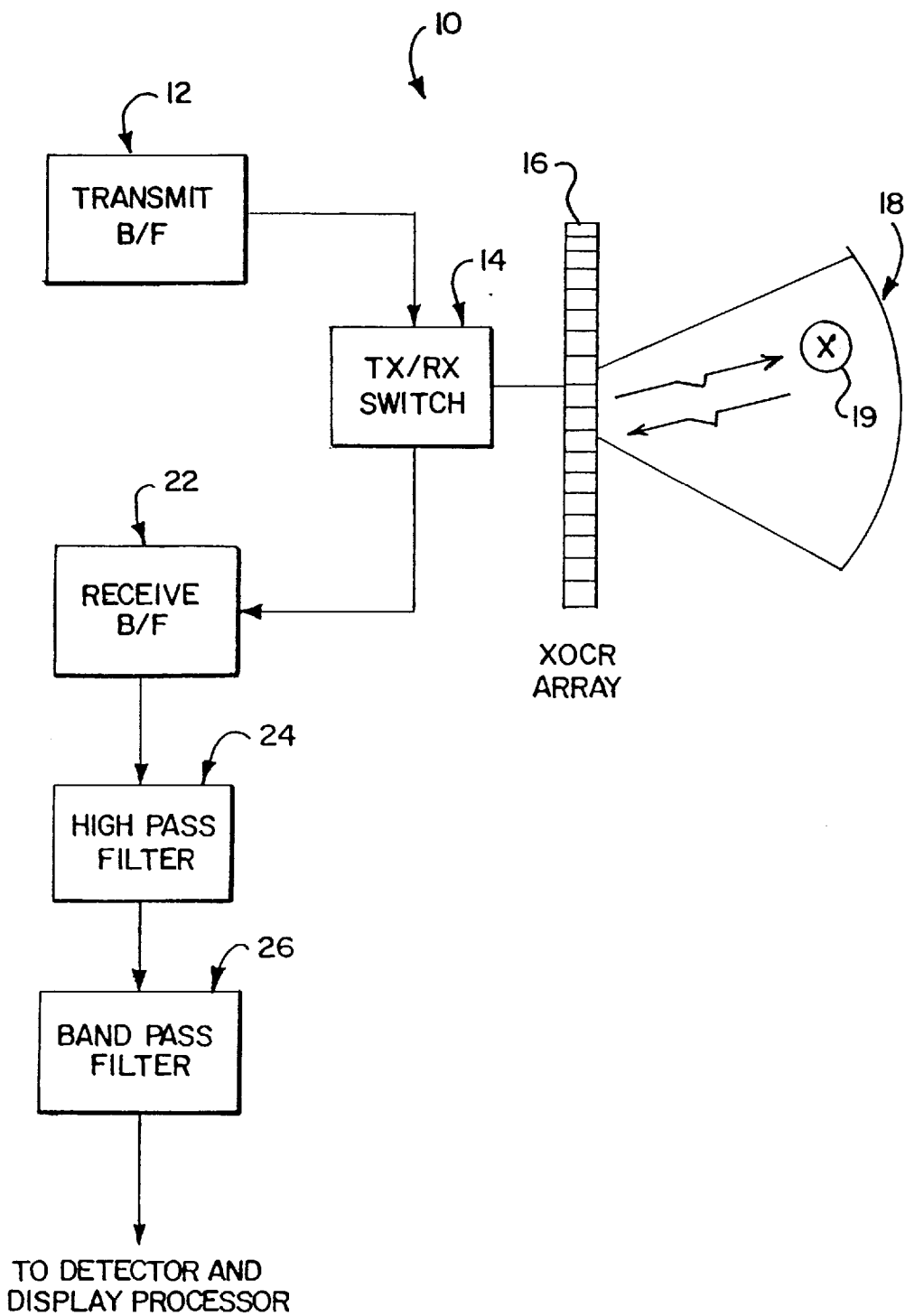
FIG. 1 is a block diagram of an ultrasound system for harmonic imaging.

The preferred embodiments described below are designed to reduce harmonic energy in the transmitted beam. Referring now to the figures, and in particular, FIG. 1, an ultrasound system is generally shown at 10. The ultrasound system 10 is configurable to transmit signals with reduced energy at harmonic imaging frequencies and improved spectral distribution of energy at fundamental frequencies. Harmonic frequencies are frequencies associated with non-linear propagation or scattering of the transmit signals, usually at integral harmonics such as second, third, and fourth harmonics. As used herein, harmonic includes second, third, fourth, and other harmonics of the fundamental. Non-linear propagation or scattering results in shifting energy associated with a frequency or frequencies to another frequency or frequencies. As used herein, harmonic shifting may also include energy shifted to subharmonics and fractional harmonics (e.g. ½ or ³⁄₂ of the fundamental).

The system 10 includes a transmit beamformer 12 that supplies high voltage transmit waveforms in a plurality of channels via a TX/RX switch 14 to a transducer array 16. Preferably, the transmit beamformer 12 and the transducer array 16 have a broadband response and are capable of transmitting the maximum allowable acoustic power densities for better signal to noise sensitivity. The transducer array 16, which can be any suitable type, generates an ultrasonic transmit beam in response to the transmit waveforms, and this transmit beam propagates outwardly through the subject 18 being imaged. The transducer 16 frequency response acts as a bandpass filter. Thus, the energies associated with harmonics higher than the harmonic of interest may be removed as the transmit waveform is radiated by the transducer 16.

Ultrasonic energy echoed by the subject 18, such as from a point 19, at the harmonic frequency is received by the transducer array 16 and focused by the receive beamformer 22. Preferably, the transducer 16 and receive beamformer 22 have a broadband response. The focused signal is preferably filtered with a high pass filter 24. The high pass filter 24 attenuates energy associated with fundamental frequencies, which are typically greater than energies associated with harmonic frequencies. Preferably, a bandpass filter 26 further reduces energies associated with frequencies other than the desired harmonic frequencies. Other receive beamformers, both digital and analog, with different or the same filtering structures may be used. The filtered information is detected and displayed as an image by a display processor (not shown).

The harmonic image represents structure within the subject 18. The harmonic signal may be generated by tissue harmonic response or by non-linear contrast agents which may be provided within the subject 18. Tissue harmonic imaging is associated with harmonic energy generation through propagation and scattering of the transmit beam by tissue within the subject 18. Contrast agent harmonic imaging is associated with harmonic energy generation through interaction of the fundamental energy with the contrast agent.

Figure 2A:
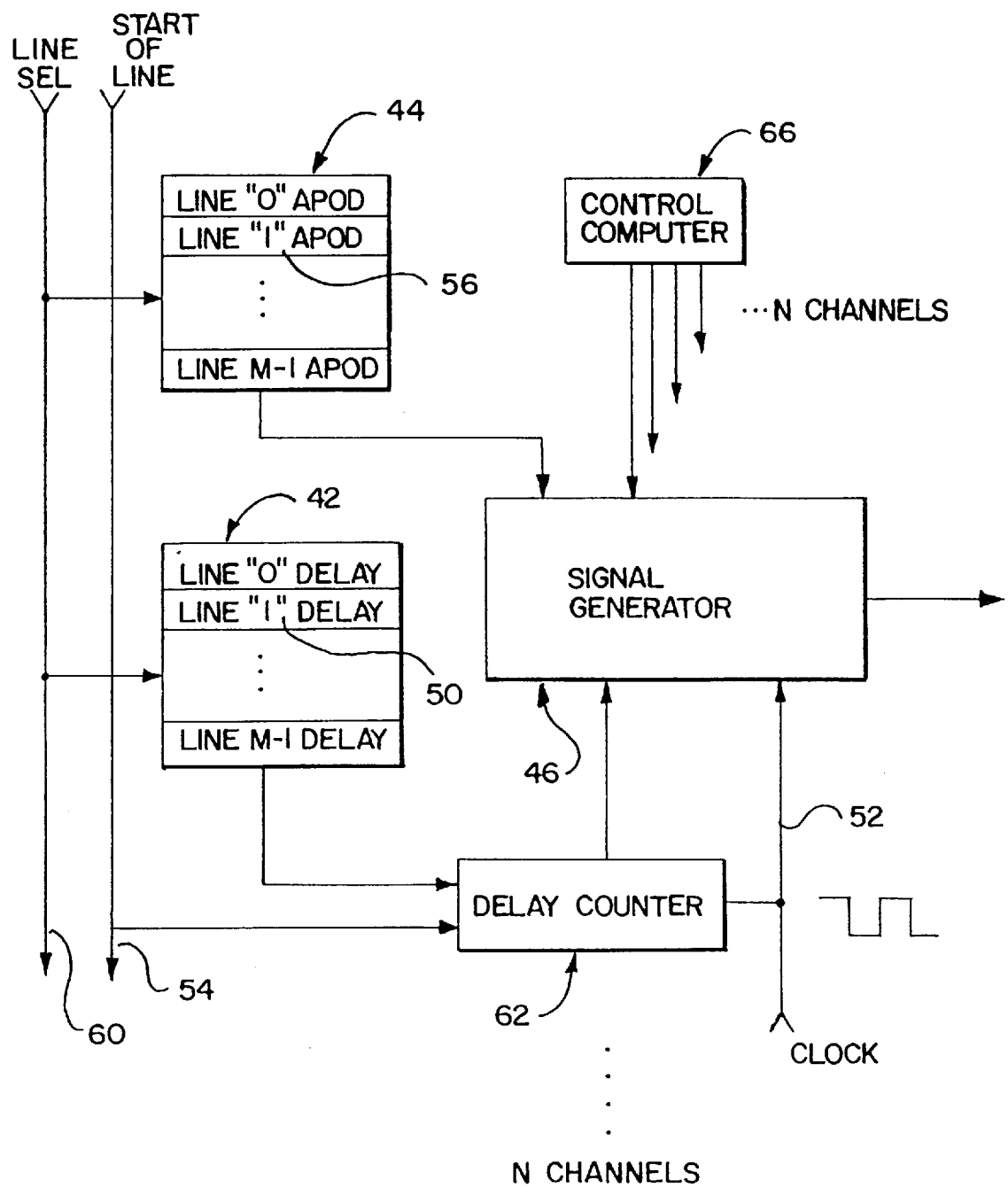
FIG. 2A is a block diagram of a transmit beamformer.

FIG. 2A shows a block diagram of a first preferred embodiment 40 of the transmit beamformer 12 of FIG. 1. As shown in FIG. 2A, the transmit beamformer 40 includes N channels, one for each of the transducers of the transducer array 16 (see FIG. 1). Each channel includes a delay memory 42, an apodization memory 44, a delay counter 62, and a signal generator 46. Any of the various structures may be used for a plurality of channels instead of in a single channel as in the preferred embodiment.

The delay memory 42 includes m delay words 50, one for each possible steering angle or ultrasound transmit scan line. Each delay word 50 of the delay memory 42 corresponds to a time delay for the transmit scan line selected and for the transducer array element connected to the appropriate transmit channel. For example, in the preferred embodiment, the delay word 50 specifies the number of transmit carrier cycles or fractional cycles to delay after a start of line signal on line 54 before generation and transmission of the transmit waveform. As discussed below, the number of cycles or fractional cycles corresponds to a focusing delay.

The delay memory 42 of FIG. 2A is not required, but reduces memory or control requirements for the signal generator 46. The delay memory 42 eliminates the need to calculate the delay or derive the delay from other parameters as the ultrasound scan line changes angles.

The apodization memory 44 includes m apodization words 56, one for each possible steering angle or ultrasound transmit scan line. Each apodization word 56 of the apodization memory 44 corresponds to an amplitude level or scaling for the particular channel and transmit scan line. Each apodization word 56 is based on apodization formats known in the art.

A computer 66 provides set-up data associated with a selected imaging mode to the signal generator 46 to specify the characteristics of the transmit waveform for the imaging mode, such as the number of cycles or pulses within the transmit waveform and the pulse width of each pulse. Other embodiments of imaging mode selection are possible. Furthermore, some systems may not provide imaging mode selection.

The signal generator 46 is of a construction known in the art for generating transmit waveforms. For example, the signal generator 46 includes control, timing, waveform generation, scaling, digital to analog conversion, and output driver circuits. Other embodiments are possible, such as the transmit beamformer disclosed in Method and Apparatus for Transmit Beamformer System, U.S. patent application Ser. No. 08/673,410, filed Jul. 15, 1996 or a multi-level switching device. Alternative means for waveform generation also include RAM or ROM memory and logic based devices. The complexity and details of the preferred embodiment of the signal generator 46 depend on the number of timing states, apodization levels, and the pulse width quantization needed to adequately generate the desired transmit waveform.

Referring to FIG. 2B, a first preferred embodiment 70 of the signal generator 46 of FIG. 2A is shown. The signal generator 70 generates pulse width modulated transmit waveforms. The signal generator 70 includes a timing sequencer 76, a waveform generator 72, a digital to analog converter (DAC) 74 and a uni-polar or bi-polar high voltage output driver 78.

In an alternative construction, a plurality of resistors and switches are used instead of the DAC 74 to weight or further provide generation of the transmit waveform at different amplitude levels. Furthermore, the waveform generator 72, such as a multi-level switched or analog device, may be capable of producing signals with varying amplitudes based on a stored waveform or other inputs without the DAC 74. In yet other alternative constructions, any of the timing sequencer 76, waveform generator 72, and other logic and control structures are shared by more than one channel.

Referring to FIGS. 2A and 2B, the apodization memory 44 is not required, but allows more precise focusing and amplitude control. Without the apodization capability and associated memory 44, the functions of the waveform generator 72, output driver 78, and DAC 74 are simplified. In this case, the signal generator 70 outputs sets of pulse widths corresponding to a constant, uniform apodization weighting.

Referring to FIG. 2A, in use, control data specifying the channel timing delay words 50, apodization words 56 and any other set-up data is provided to the transmit beamformer 40. Other set-up data is preferably provided by the computer 66, including parameters such as carrier frequency, bandwidth, and other information as a function of possible timing states. In alternative constructions, any of the control data may be provided by alternative structures.

Based on the control data, each channel responds to a scan line selection signal on line 60 by loading the delay and apodization words 50 and 56 for the selected scan line. The delay word 50 from the delay memory 42 is loaded into the delay counter 62. Since the delay word 50 is preferably specified in fractions of a carrier cycle, the delay word 50 is used to select a finely quantized timing state corresponding to the clock phase. The delay counter 62 responds to a start of scan line signal on the line 54 by incrementing or decrementing the stored value with each cycle of the clock on the line 52. When the counter 62 counts to zero, the next cycle initiates a start signal for waveform generation Referring to FIG. 2B, the start signal is received by the sequencer 76. The sequencer 76 also generates the appropriate timing states for pulse width modulated pulse generation by the waveform generator 72. The timing states correspond to the number of cycles and pulse width information. Thus, the waveform generator 72 is enabled for the duration of each desired non-zero output of the signal generator 46. The sequence of enabling and disabling as a function of the timing states acts as a rectangular window function determining the number of cycles (duration of the window) and the pulse width (duration of each pulse).

Referring to FIGS. 2A and 2B, the signal generator 46 also receives the apodization word 56 from the apodization memory 44. The apodization word 56 is converted to an analog signal by the DAC 74. The apodization information is preferably used by the output driver 78 as a scale factor for the generated waveform. In an alternative embodiment of the signal generator 70, the apodization scaling information output by the DAC 74 is provided to the waveform generator 72.

Based on the set-up data, such as pulse width information, and sequencer state information, the waveform generator 72 produces a pulse width modulated waveform. The preferred signal generator 70 outputs a clocked sequence of pulse width modulated pulses during the active portion of the transmit pulse or pulses generation. The clocked sequence is preferably coarsely sampled, such as at a rate of four samples per carrier cycle. The sequencer 76 provides timing states for generating successive pulse widths in the sampled pulse train, or pulse width modulated transmit waveform. Preferably, the pulse width modulated transmit waveform includes at least two carrier cycles. Other sampling rates may be used as discussed below. The pulse widths of each pulse output from the waveform generator 72 are controlled through the set-up data in response to the timing states. The preferred method of determining the widths and the corresponding set-up data is described below, although other methods may be used.

The pulse width modulated signals are amplified by the output driver 78. The output driver 78 also receives the analog apodization information from the DAC 74. The output driver 78 amplifies the pulse width modulated signals and scales the amplitude of the signals in response to the apodization information. Preferably, the output power of the output driver 78 is regulated by changing the voltage or current amplification of the output driver 78 for every channel the same factor. Any apodization for each channel preferably involves changing the waveform amplitude in response to the apodization information from the DAC 74. The output of the output driver 78 is the transmit waveform discussed above and is applied to the respective transducer via the TX/RX switch (see FIG. 1). Thus, a uni-polar or bi-polar high voltage transmit waveform is generated. When the pulse train for the desired transmit waveform is complete, the sequencer 76 returns to an idle state until the next start signal is received.

The pulse width modulation of the transmit waveform enhances insonification for harmonic imaging. The computer 66, either in real-time or as part of the set-up, provides information for generating any of various waveforms for use with signal generators 46 of various complexity. The waveforms are shaped to suppress ultrasonic energy in a wide pass band centered at the harmonic frequency of the fundamental center frequency of the transmit waveform. A calculation demonstrating the transmit waveform corruption of energies in the harmonic frequency band is a harmonic power ratio. The harmonic power ratio is the ratio of residual power of the waveform spectrum in the desired harmonic band, such as a band centered around the second order harmonic, to the power of the waveform spectrum in the corresponding fundamental band. A filter suitable for imaging is applied to the fundamental band of energies. The power of the filtered signal is calculated. The same filter is shifted and applied to the harmonic band of energies. The power of this filtered signal is also calculated. The harmonic power ratio is the ratio of these two powers. The transmit waveforms are associated with any of various harmonic power ratios. Lower harmonic power ratios are associated with less interference from transmitted energy for harmonic imaging. The suppressed harmonic transmission allows the system to distinguish between harmonic echoes (tissue or contrast agent based) and linear echoes.

The waveforms are preferably shaped to provide optimum fundamental band efficiency. The efficiency of a waveform is a function of the spectral energy in a weighted band around the fundamental center frequency when the peak is normalized to a given value. For the optimum sensitivity in tissue harmonic imaging, the transmit beamformer 40 transmits at or near the maximum allowed acoustic power density. For harmonic imaging of contrast agents, the power levels may be reduced to avoid destruction of the contrast agent. Thus, efficiency is one factor to be considered in designing and generating the waveform.

The complexity of the waveform is another such factor. Waveforms requiring only coarse sampling, less pulse width quantization, fewer amplitude levels and less amplitude quantization accuracy in the DAC processing require less complex and costly hardware to generate. Since a plurality of signal generators 46 are typically used, the cost difference between signal generators 46 is an important consideration.

Figure 3:
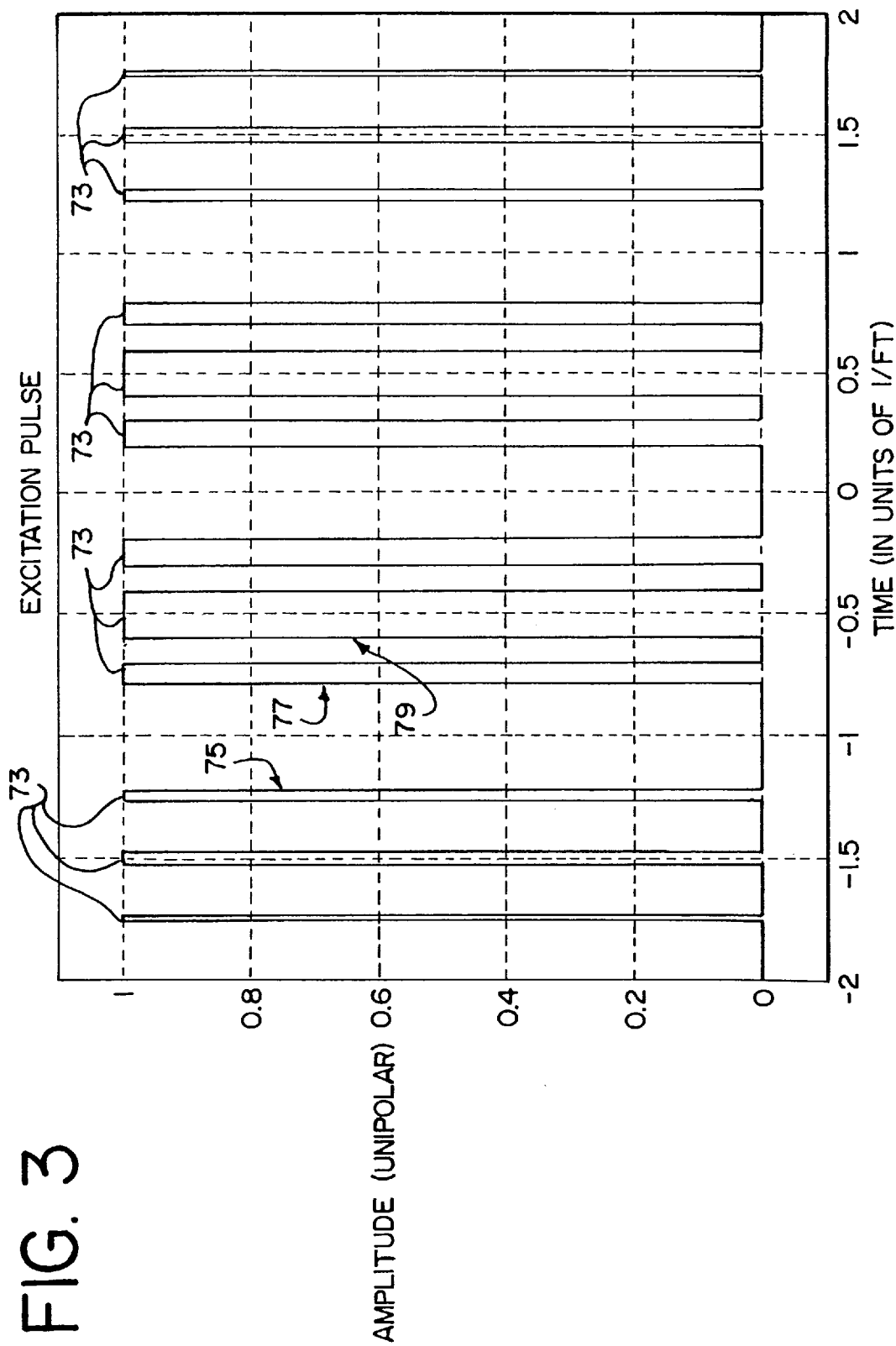
FIG. 3 is a graphical representation of a uni-polar transmit waveform.
Figure 5:
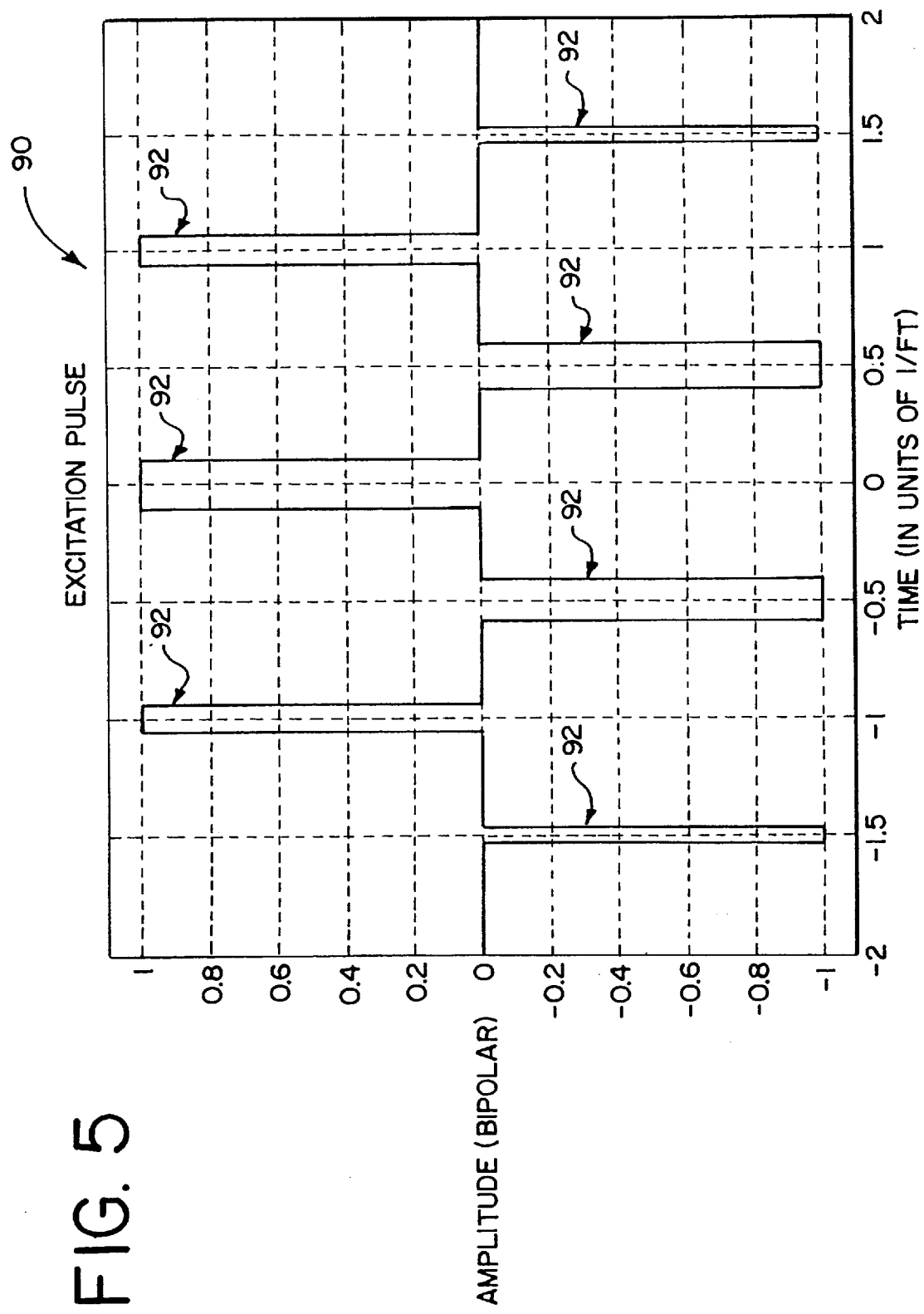
FIG. 5 is a graphical representation of a bi-polar transmit waveform.

The transmit waveforms are either uni-polar or bi-polar. For example, a uni-polar transmit waveform 71 is shown in FIG. 3. The transmit wave includes a plurality of pulses 73. The pulses 73 correspond to intervals along the time axis where the amplitude starts at zero or another value and then returns to zero or another value. The transmit waveforms are either rectangular, such as the transmit waveform 71 in FIG. 3, or other shapes. Stepped or rectangular pulses 73 may include curved or other shapes. The uni-polar transmit waveform 71 includes two amplitude levels (on/off), not including any apodization. Referring to FIG. 5, the bi-polar transmit waveform 90 has three amplitude levels (positive/off/negative), not including any apodization. Stepped waveforms, such as waveforms with multiple positive or negative amplitude levels, are also possible. Stepped waveforms have at least two positive or negative amplitude levels or a combination of a plurality of positive and negative amplitude levels. Any of the various transmit waveforms discussed above or other transmit waveforms may be used as part of the present invention.

Characteristics of the transmit waveform generated for each channel are set to enhance insonification for harmonic imaging. The width of pulses and the distance between the pulses are set. For example and referring to FIGS. 2A and 3, the pulse width information controls generation of the transmit waveform 71. Control signals based on the timing state enable the signal generator 46 at the appropriate time to generate a pulse 73. Other control signals based on the timing state disable the signal generator 46 at the appropriate time to discontinue generation of the pulse 73. Based on the control signals, pulses 73 with different durations or widths are generated. The distance or duration between pulses 73 is also set. For finer adjustment of the duration of the pulses 73, the transmit beamformer 40 samples more frequently. Any transmit beamformer 40 capable of generating pulses 73 with different widths is capable of practicing the present invention.

Referring to FIG. 3, the duration or width of each pulse 73 within the transmit waveform 71 is varied to reduce energies transmitted at harmonic frequencies, such as the second order harmonic frequencies. The duration corresponds to the beginning and end of the pulse 73. For second order harmonic imaging, the widths of the pulses 73 vary responding to an envelope which increases gradually to a maximum value and then decrease gradually within the waveform 71. Other width patterns may be used. More or fewer pulses 73 may be used. Furthermore, the width associated with each pulse and the order of the pulses 73 may be changed.

The distance or duration between the pulses 73 is set to enhance insonification for harmonic imaging. In particular, the duration between the center of two adjacent pulses 73 is different than the duration between the center of two other adjacent pulses 73. The center of a pulse 73 corresponds to the center along the time axis based on the beginning and end of the pulse. For example, the duration between the center of a pulse 75 and a pulse 77 is approximately 0.5 of the period of the transmit waveform 71. The duration between the center of the pulse 77 and a pulse 79 is approximately 0.25 of the period of the transmit waveform 70. Each different duration may have any value, but depends on the sampling rate.

Figure 4:
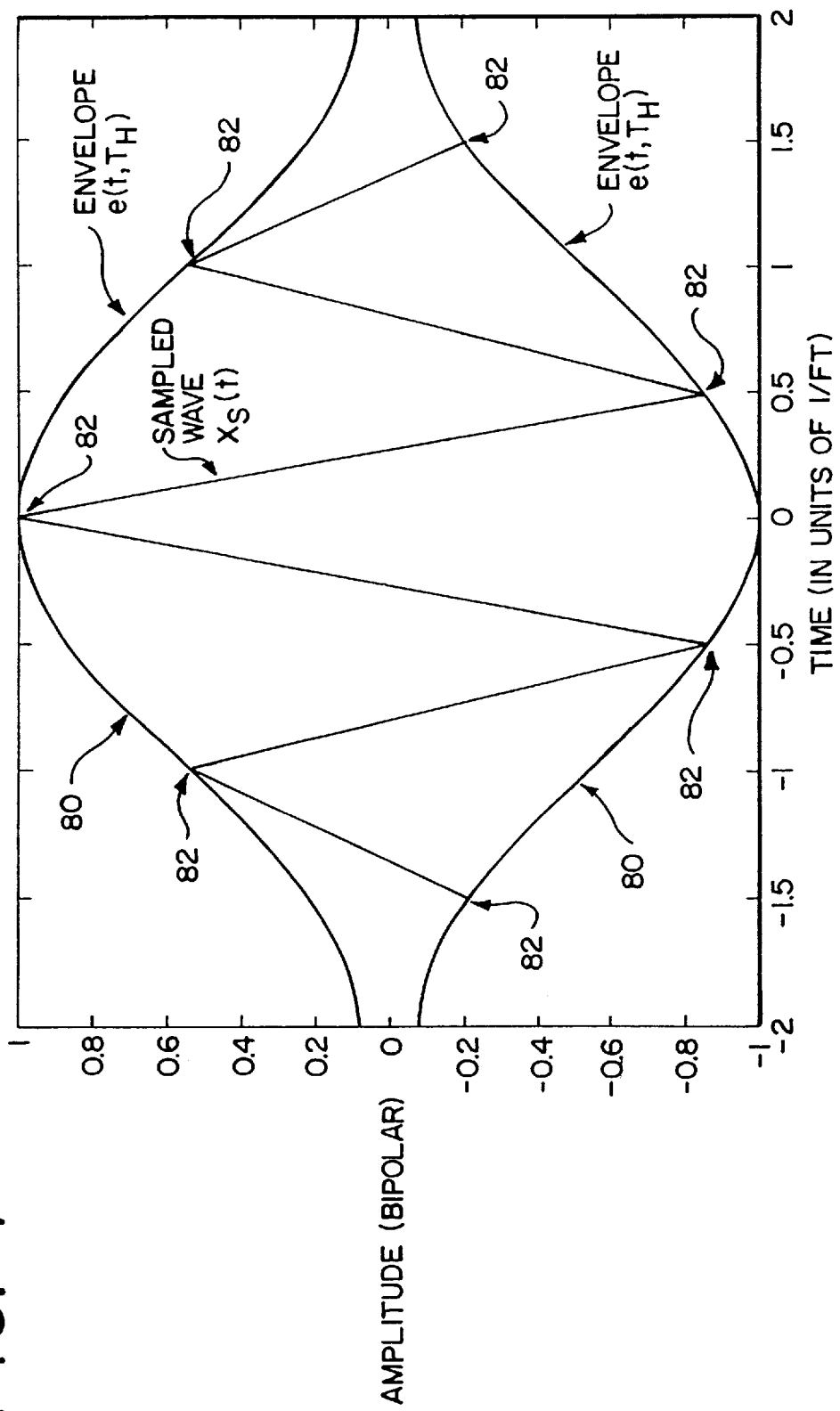
FIG. 4 is a graphical representation of a sampling function.

Both the distance between any two pulses and the width of any pulse are determined based on experimentation or other calculations. For example, the widths of the pulses 73 are set to approximate the energy content of a transmit waveform with desired amplitude characteristics. Referring to FIG. 4, an envelope 80 associated with the desired frequency response, such as low transmission of energy at second order harmonic frequencies and high transmission of energy at fundamental frequencies, is selected. The envelope 80 is represented with both positive and negative amplitudes for development of a bi-polar transmit waveform. The envelope 80 corresponds to a Hamming envelope, but other envelopes or waveforms may be used, such as Gaussian envelopes. The Hamming envelope 80, $e(t, T_H)$, is represented as equal to $[0.54+0.46 \cos(2\pi t/T_H)] \text{rect}(t/T_H)$ where $T_H$ is the period of the envelope and t is time. Other representations may be used. The period $T_H$ is selected based on the desired number of pulses within the envelope, such as 3.5. The selected value for $T_H$ determines, in part, the frequency response associated with the fundamental frequencies.

The amplitude of the envelope 80 is sampled at a plurality of points 82. The number of points 82 sampled depends on the sampling frequency, $F_s$, and $T_H$. The amplitude, $X_S(t)$, is represented as $e(t, T_H)\cos(2\pi F_T t)\Sigma_k \delta(t-k/F_S)$ where $F_T$ is the transmit center frequency of the envelope 80, and k represents a pulse number. Preferably, $F_S$ is equal to M $F_T$, where M is associated with the number of samples and, in this example, is 4. Lowering the value of M results in fewer pulses in the transmit waveform and, generally, a less complex transmit beamformer 12 (see FIG. 1). For uni-polar transmit waveforms, $\cos(2\pi F_T t)$ is replaced with $[1-\cos(2\pi F_T t)]$. Removing time from the sampling amplitude function, $X_S(t)$, $X_S(t)$ is represented as $\Sigma_k e(k/4F_T, T_H) \cos(k\pi/2)\delta(t-k/4F_T)$.

The width of each pulse is a function of $X_S(t)$. In particular, the width of each pulse, k, associated with a time, t, is $X_S(t)/F_S$, where $F_S=M F_T$. "t" increments by $k/F_S$. Referring to FIG. 5, a bi-polar transmit waveform 90 comprises 7 pulses 92 corresponding to the 7 sample points 82 shown in FIG. 4. The widths of the pulses 92 correspond to the widths calculated as discussed above. Thus, like the amplitude of the envelope 80 (see FIG. 4), the duration of the pulses 92 increases gradually to a maximum value and then decreases gradually. The width of the pulses 92 within the transmit waveform 90 are modulated as a function of another waveform, such as the envelope 80 (see FIG. 4). Other width variation patterns and calculations may be used.

The frequency response of the transmit waveform 90 or other transmit waveforms is further altered by including pulses 92 shifted by $1(N * F_T)$, where N is a value selected based on the harmonic frequencies being suppressed. For example, N=4, corresponding to 90 degrees, suppresses the energies associated with second order harmonics in the transmit waveform. Other values of N or shifts may be used. The shifted pulses may, but preferably do not, overlap along the time axis with non-shifted pulses. The inclusion of the shifted pulses further suppresses energies transmitted at harmonic frequencies, such as the second order harmonic.

Figure 6:
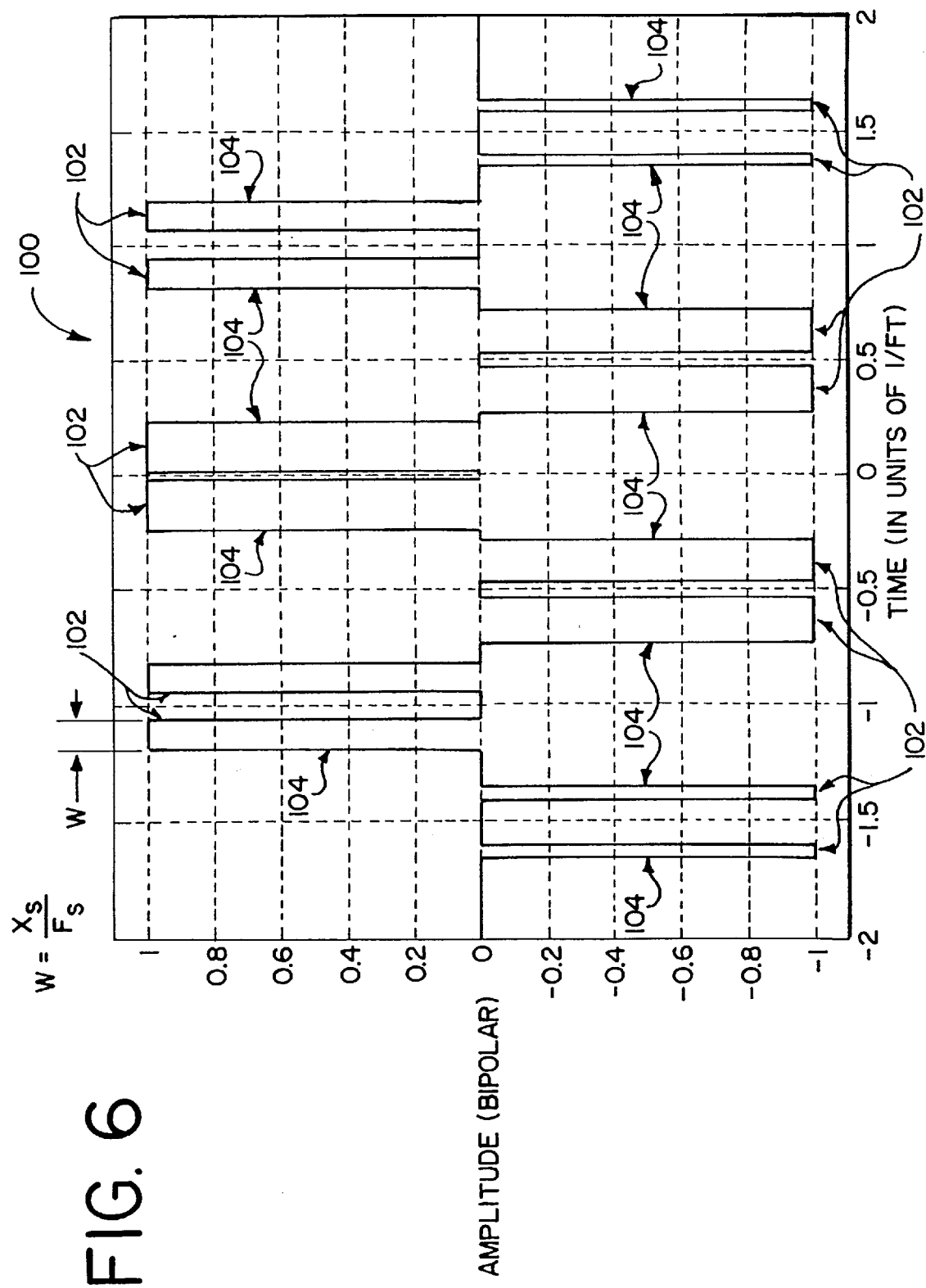
FIG. 6 is a graphical representation of a convolved bi-polar transmit waveform.

Referring to FIG. 6, the transmit waveform 100 includes pairs of pulses 102. The pulses 104 within each pair 102 are phase delayed by 90 degrees relative to each other. The 90 degree phase delay is represented by ¼ $F_T$. Other representations may be used. The transmit waveform 100 is designed by shifting one pulse 104 of each pair of pulses 102 by 45 degrees or ⅛ $F_T$ in one direction along the time axis. The other pulse 104 of each pair of pulses 102 is shifted by 45 degrees or ⅛ $F_T$ in another direction along the time axis. For example, the transmit waveform 90 shown in FIG. 5 is convolved based on the equation $½[\delta(t+⅛ F_T)+\delta(t-⅛ F_T)]$. The convolved and phase shifted transmit waveform 100 is shown in FIG. 6.

Figure 7:
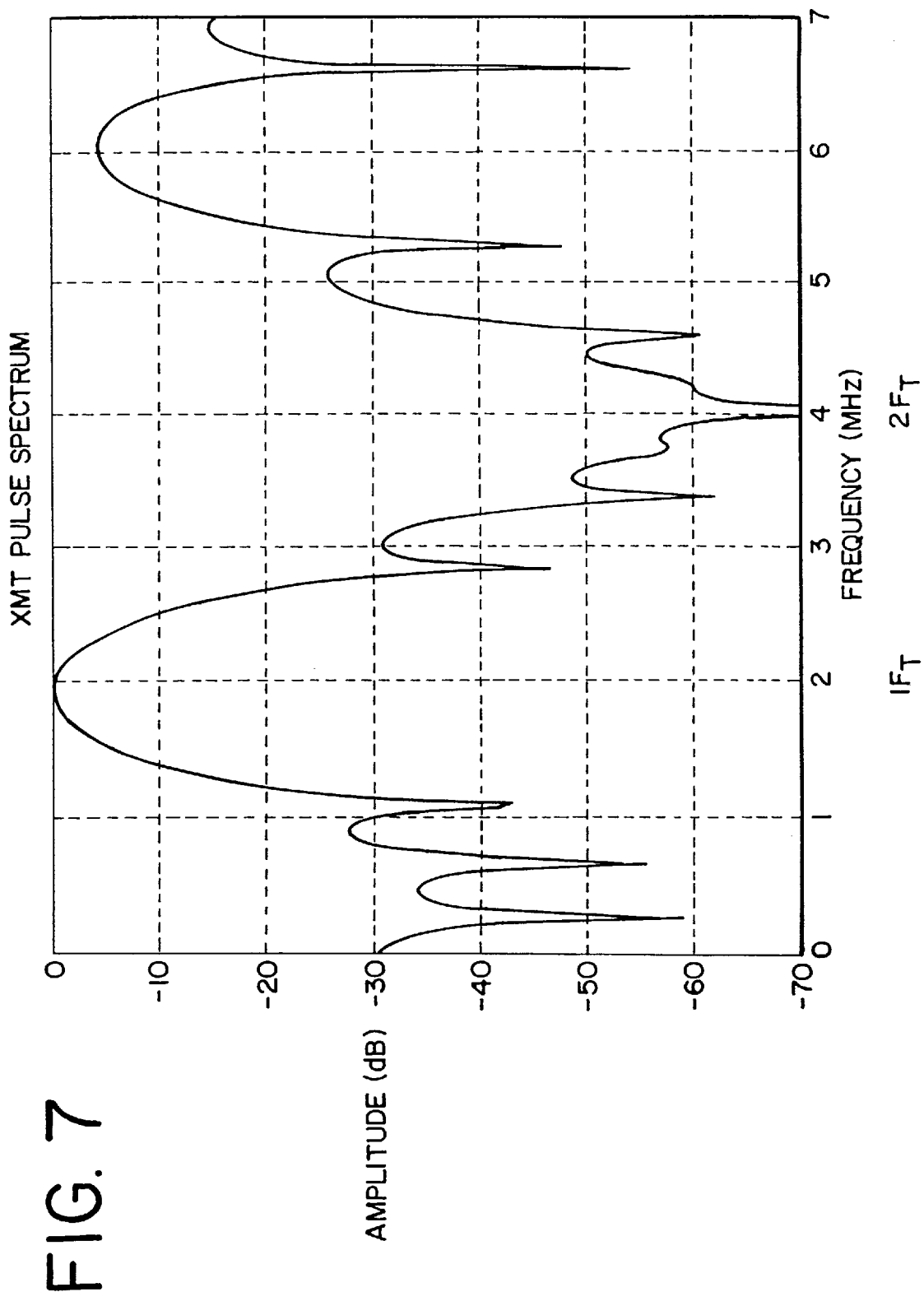
FIG. 7 is a graphical representation of the spectra associated with the transmit waveform of FIG. 6.

Referring to FIG. 7, the Fourier transform or frequency response of the transmit waveform 100 shown in FIG. 6 is demonstrated graphically. Based on a 2 MHz center transmit frequency, $F_T$, the energy transmitted at the second order harmonic center frequency of 4 MHz is suppressed by more than 60 dB. Other waveforms with varying pulse widths and/or distances between pulses may be used and may provide better or worse suppression at the center harmonic frequency, other harmonic frequencies or within a band of harmonic frequencies. By varying the width of pulses or distances between pulses, transmit waveforms with various frequency responses may be designed and transmitted.

In addition to varying the width and distance associated with pulses in a transmit waveform, the transmit waveforms may have varying amplitude levels. The amplitude of each transmit waveform is shaped to gradually rise to a maximum value and gradually decrease from the maximum value. Each transmit waveform is shaped by modulating a carrier waveform with an envelope waveform. Alternatively and with respect to transmitting a uni-polar waveform, a shaped low pass off-set waveform with a gradually increasing and decreasing amplitude is summed with a bi-polar waveform. The summation represents a uni-polar waveform for harmonic imaging. The signal generator generates the modulation or off-set based transmit waveform for transmission. The shaping of the amplitude of the transmit waveform to reduce energies associated with harmonic frequencies is discussed in U.S. application No. (unassigned - Attorney Docket No. 5050/220) for Ultrasound Imaging Method And System For Transmit Signal Generation For An Ultrasonic Imaging System Capable Of Harmonic Imaging, assigned to the assignee of the present invention and filed concurrently herewith, the disclosure of which is hereby incorporated by reference.

As an alternative embodiment, one or more filters may be added to the transmit beamformer 40 of FIG. 2. A filter, such as a digital, low pass filter, filters the output of the waveform generator. The filter may also comprise an analog filter. The output of the signal generator can be any of the various waveforms discussed above, such as the bi-polar waveforms, or other waveforms. The filter reduces the high frequency components associated with the sharp rise and fall time of rectangular signals of the transmit waveform.

As a further alternative embodiment, another filter may be added to the output of the amplifier. The filter is further designed to suppress transmitted energy associated with various harmonic frequencies, such as at least by 30 dB with respect to the fundamental frequencies. Thus, the generated waveform as discussed above and the filter, in combination, reduce the transmitted energy associated with harmonic frequencies. As a further alternative, the filter, such as a low pass analog filter, filters the output of the DAC or the amplifier. The filtering of the waveform to reduce energies associated with harmonic frequencies is discussed in U.S. application No. (unassigned - Attorney Docket No. 5050/221)) for Ultrasonic Contrast Agent Imaging System and Method (a continuation-in-part of U.S. application Ser. No. 08/642,528), assigned to the assignee of the present invention and filed concurrently herewith, the disclosure of which is hereby incorporated by reference.

As yet another alternative embodiment, the transmit waveforms discussed above may be used in combination with summation of waveforms in the acoustic domain. As disclosed in U.S. application No. (unassigned - Attorney Docket No. 5050/219) for Ultrasound Imaging Method And System For Harmonic Imaging Pulse Shaping In The Acoustic Domain assigned to the assignee of the present invention and filed concurrently herewith, the disclosure of which is hereby incorporated by reference, the transmit waveform associated with a first transducer element or elements is shaped relative to a second waveform associated with a second transducer element or elements. For example, the first waveform (1) is delayed by a fraction of a cycle or a plurality of cycles, (2) is adjusted in amplitude, (3) is transmitted for a different number of cycles or any combination of two or all three of (1), (2), and (3) relative to the second waveform. The first and second waveforms are focused at a point and transmitted. The transmitted waveforms sum in the acoustic domain at the point to form the desired waveform for reduction of energies transmitted in the harmonic frequencies. Preferably, the desired waveform corresponds to an amplitude that rises gradually to a maximum value and decreases gradually from the maximum value.

As an example of alteration of transmitted waveforms as a function of the resulting summed signal in the acoustic domain, the first and second waveforms are each the transmit waveform 90 shown in FIG. 5. Transmission of the first waveform is delayed by a ¼ of a cycle or 90 degrees relative to the second waveform. At the point in the body, the first and second waveform sum together to form a third waveform. The third waveform is generally the same as the transmit waveform 100 of FIG. 6. The number of cycles and amplitude shape of the first and second waveforms may also be controlled to create the desired third waveform in the acoustic domain.

Any of the various alternatives discussed above, such as pulse width modulation, filtering, generation of waveforms with multiple amplitudes and summation of waveforms in the acoustic domain may be used in combination. The combination may include more than two of the alternatives discussed above.

It should be understood that many changes and modifications can be made to the embodiments described above. For example, different ultrasound systems with different levels of programmability may be used. Different transducers and system configurations may also be used. Many of the various processes discussed above may be analog or digital processes. It is therefore intended that the foregoing detailed description be understood as an illustration of the presently preferred embodiments of the invention, and not as a definition of the invention. It is only the following claims, including all equivalents, that are intended to define the scope of the invention.

We claim:

1. In a method comprising the steps of (a) transmitting ultrasonic energy at a fundamental frequency and (b) receiving reflected ultrasonic energy at a harmonic of the fundamental frequency in an ultrasound system, an improvement wherein step (a) comprises the step of:

(a1) transmitting a waveform comprising at least a sequence of at least a first and second pulse characterized by first and second pulse durations, respectively, said second pulse duration different than said first duration.

2. The method of claim 1 wherein the step (a1) further comprises generating said waveform as a uniform amplitude waveform.

3. The method of claim 1 wherein the step (a1) further comprises the step of (a2) modulating said sequence with varying pulse duration.

4. The method of claim 3 wherein the step (a3) comprises approximating an energy content of a transmit waveform comprising an envelope shape rising gradually to a respective maximum value and falling gradually from the respective maximum value.

5. The method of claim 1 wherein the step (a1) further comprises transmitting said waveform comprising at least said first and second pulses and at least a third pulse in sequential order.

6. The method of claim 5 wherein the step (a1) further comprises transmitting said waveform comprising a first time between said first and second pulses and a second time between said second and third pulses, wherein said second time is different than said first time.

7. The method of claim 6 wherein the step (a2) further comprises modulating as a function of energy.

8. The method of claim 7 wherein the step (a2) comprises setting the energy of each of three time intervals as a function of frequency, wherein the energy associated with a first interval of said three time intervals is less than the energy associated with a second interval of said three time intervals.

9. The method of claim 5 wherein the step (a1) further comprises transmitting said first and third pulses with a shorter duration than said second pulse.

10. The method of claim 1 wherein the step (a) further comprises generating said waveform as a uni-polar waveform.

11. The method of claim 1 wherein the step (a) further comprises generating said waveform as a bi-polar waveform.

12. The method of claim 1 wherein the step (a) further comprises generating said waveform as a rectangular waveform.

13. The method of claim 1 wherein the step (a) further comprises generating said waveform as a plurality of amplitude levels.

14. The method of claim 1 wherein step (a) comprises the step of transmitting ultrasound energy to a contrast agent.

15. The method of claim 1 wherein the step (a1) further comprises transmitting a plurality of said waveforms from a plurality of transducer elements, respectively.

16. The method of claim 1 wherein the step (a1) comprises transmitting said first pulse with a shorter duration than said second pulse.

17. The method of claim 1 wherein the step (a1) comprises transmitting said first pulse with a longer duration than said second pulse.

18. The method of claim 1 wherein said waveform comprises a first waveform and wherein the step (a1) further comprises:

setting a characteristic selected from the group of: a cycle delay in addition to focusing delay, a number of cycles and a combination thereof of at least a first waveform applied to at least a first of a plurality of transducer elements relative to at least a second waveform applied to at least a second of said plurality of transducer elements as a function of a shape comprising a sum of said first and second waveforms; and transmitting ultrasonic energy responsive to at least said first and second waveforms from at least said first and second transducer elements, respectively, focused substantially at a point, said ultrasonic energy summed at said point comprising said shape, wherein said shape rises gradually to a respective maximum value and falls gradually from said respective maximum value.

19. The method of claim 1 further comprising the steps of:

(a2) generating said waveform as a bipolar waveform; and (a3) applying an amplitude baseline offset to said bipolar waveform, wherein at least said waveform comprises a sum of said bipolar waveform and said amplitude baseline offset.

20. The method of claim 1 further comprising the step of (a1) generating said waveform as a rectangular waveform amplitude modulated with an envelope signal.

21. The method of claim 1 further comprising the step or steps of any combination of two or three of steps a2, a3, and a4:

(a2) wherein said waveform comprises a first waveform, further comprising the steps of:

(i) setting a characteristic selected from the group of: a cycle delay, a number of cycles and a combination thereof of at least said first waveform applied to at least a first of a plurality of transducer elements relative to at least a second waveform applied to at least a second of said plurality of transducer elements as a function of a shape comprising a sum of said first and second waveforms; and (ii) transmitting ultrasonic energy responsive to at least said first and second waveforms from at least said first and second transducer elements, respectively, focused substantially at a point, said ultrasonic energy summed at said point comprising said shape, wherein said shape rises gradually to a respective maximum value and falls gradually from said respective maximum value;

(a3) a step comprising (i) generating said waveform as a bipolar waveform; and (ii) applying an amplitude baseline offset to said bipolar waveform, wherein at least said waveform comprises a sum of said bipolar waveform and said amplitude baseline offset; and (a4) modulating the amplitude of at least one pulse in said waveform.

22. The method of claim 1 wherein the step (a1) comprises transmitting said waveform comprising at least a third and fourth pulse, wherein said third and fourth pulses correspond to said first and second pulses, respectively, shifted in phase.

23. The method of claim 22 wherein the step (a1) further comprises shifting said third and fourth pulses 90 degrees from said first and second pulses, respectively.

24. An ultrasound apparatus for transmitting ultrasonic energy at a fundamental frequency for receipt of reflected ultrasonic energy at a harmonic of the fundamental frequency comprising:

a transducer; and a signal generator connected to said transducer, and operative to generate a sequence comprising at least first and second pulses, each pulse characterized by a respective pulse duration, said pulse duration modulated such that the pulse durations for the first and second pulses differ from one another.

25. The apparatus of claim 24 wherein said signal generator comprises a pulse generator and said sequence comprises uniform amplitude pulses.

26. An ultrasound apparatus for transmitting ultrasonic energy at a fundamental frequency for receipt of reflected ultrasonic energy at a harmonic of the fundamental frequency, said apparatus comprising:

a transducer; and a waveform generator connected to said transducer and operative to generate an ordered sequence of a plurality of pulses, wherein a first duration between a first and second pulse is different than a second duration between said second pulse and a third pulse.

27. In a method comprising the steps of (a) transmitting ultrasonic energy at a fundamental frequency and (b) receiving reflected ultrasonic energy at a harmonic of the fundamental frequency in an ultrasound system, an improvement wherein step (a) comprises the step of:

(a1) transmitting a waveform comprising a plurality of pulses in an ordered sequence, wherein a first duration between first and second pulses is different than a second duration between said second pulse and a third pulse.

28. In a method comprising the steps of (a) transmitting ultrasonic energy at a fundamental frequency and (b) receiving reflected ultrasonic energy at a harmonic of the fundamental frequency in an ultrasound system, an improvement wherein step (a) comprises the step of:

(a1) transmitting a waveform comprising a plurality of pulses, at least a first and second pulse having a first and second pulse duration, said first pulse duration different than said second pulse duration and determined as a function of an approximation of an energy content of a transmit waveform comprising an envelope shape rising gradually to a respective maximum value and falling gradually from the respective maximum value.

29. A method of generating a waveform comprising a sequence of pulses transmitted from at least one of a plurality of transducer elements for harmonic imaging in an ultrasound system, the method comprising the steps of:

generating at least a first pulse comprising a first pulse width;

generating at least a second pulse comprising a second pulse width, said second pulse width different than said first pulse width; and transmitting said waveform comprising at least said first and second pulses in sequential order.

30. In a method comprising the steps of (a) transmitting ultrasonic energy at a fundamental frequency and (b) receiving reflected ultrasonic energy at a harmonic of the fundamental frequency in an ultrasound system, an improvement wherein step (a) comprises the step of:

(a1) transmitting a waveform comprising a plurality of pulses, at least a first pulse comprising a first pulse duration, wherein the duration between said first pulse and a second pulse is different than said first pulse duration.

* * * * *